US005956056A

United States Patent [19]

Kaneko et al.

[11] Patent Number: 5,956,056

[45] Date of Patent: Sep. 21, 1999

[54] INK JET RECORDING APPARATUS AND METHOD OF RECORDING WITH SEPARATED IMAGE DATA

[75] Inventors: Mineo Kaneko; Haruyuki Matsumoto, both of Yokohama; Yoshifumi Hattori, Yamato; Yoichi Tosaka, Yokohama; Isao Ebisawa, Kawasaki; Tadashi Yamamoto; Masashi Miyagawa, both of Yokohama, all of Japan

[73] Assignee: Canon Kabushiki Kaisha, Tokyo, Japan

[21] Appl. No.: 08/143,131

[22] Filed: Oct. 29, 1993

[30] Foreign Application Priority Data

Oct. 30, 1992 [JP] Japan .................................... 4-293006

[51] Int. Cl.[6] .............................. B41J 2/21; G05B 15/00

[52] U.S. Cl. .............................................. 347/43; 395/115

[58] Field of Search ................................ 347/43, 40, 42; 346/46; 395/115, 116

[56] References Cited

U.S. PATENT DOCUMENTS

| | | | |
|---|---|---|---|
| 4,313,124 | 1/1982 | Hara | 347/57 |
| 4,320,406 | 3/1982 | Heinzl | 347/43 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,528,576 | 7/1985 | Koumura et al. | 347/43 X |
| 4,558,333 | 12/1985 | Sugitani et al. | 347/65 |
| 4,723,129 | 2/1988 | Endo et al. | 347/56 |
| 4,740,796 | 4/1988 | Endo et al. | 347/56 |
| 4,855,752 | 8/1989 | Bergstedt | 347/43 X |
| 4,908,638 | 3/1990 | Albosta et al. | 347/43 |
| 4,965,595 | 10/1990 | Yoshimura | 347/43 X |
| 5,012,257 | 4/1991 | Lowe et al. | 347/43 |
| 5,208,605 | 5/1993 | Drake | 347/40 X |
| 5,278,582 | 1/1994 | Hongo | 347/43 X |
| 5,323,487 | 6/1994 | Morita et al. | 395/115 |

FOREIGN PATENT DOCUMENTS

| | | | |
|---|---|---|---|
| 0396982 | 11/1990 | European Pat. Off. . | |
| 0401575 | 12/1990 | European Pat. Off. . | |
| 0481829 | 4/1992 | European Pat. Off. . | |
| 3412531 | 10/1985 | Germany | 347/43 |
| 54-56847 | 5/1979 | Japan . | |
| 59-123670 | 7/1984 | Japan . | |
| 59-138461 | 8/1984 | Japan . | |
| 60-71260 | 4/1985 | Japan . | |
| 60-120066 | 6/1985 | Japan . | |
| 1-208143 | 8/1989 | Japan . | |

*Primary Examiner*—David F. Yockey

*Attorney, Agent, or Firm*—Fitzpatrick, Cella, Harper & Scinto

[57] ABSTRACT

Three discharge port groups, each having a plurality of discharge ports, discharge inks of three primary colors to record swaths of the respective colors on a recording medium and repeat the discharging to complete a record. Joints of each of Y, M and C color swaths are spaced from joints of swaths of the other two colors by an equal distance, and the discharge port groups are offset from each other by 8n times of a discharge port pitch in a direction of feed of the recording medium. In a number of image buffers corresponding to the discharge ports, image data in one buffer is separated from image data in a different image buffer by an amount that is an integer multiply of one 8 bit byte.

22 Claims, 8 Drawing Sheets

INK JET RECORDING APPARATUS AND METHOD OF RECORDING WITH SEPARATED IMAGE DATA

BACKGROUND OF THE INVENTION

1. Field of the Invention

The present invention relates to an ink jet recording apparatus which discharges color ink to effect color recording.

2. Related Background Art

In the art of a color recording apparatus, thermal transfer, electro-photographic and ink jet recording methods have been used. Among others, the ink jet recording method has recently been attracting notice because it can offer a highly fine image with a low cost.

In a color ink jet recording apparatus, a plurality of heads for jetting (discharging) inks of three primary colors are arranged and they are repeatedly scanned over a record sheet to effect recording. In U.S. Pat. No. 4,320,406, U.S. Pat. No. 4,855,752 and EP 481,829 (U.S. application Ser. No. 600, 640 now abandoned) disclose a method for jetting inks of a plurality of colors from a single head.

However, the prior art apparatus has the following disadvantages. Where a plurality of discharge ports, for example, discharge nozzles are formed in one head, the volumes of droplet discharged from the nozzle at an end and the nozzle at a center are different because of a difference in the diameters of the nozzles due to the difference in the flow of etchant in forming the nozzle by etching, or a difference of propagation of pressure to discharge the droplets. Such difference in the volumes of the droplets appears as ununiform density on a record sheet and lowers the image quality.

In the prior art apparatus, when recording is to be effected by using three primary colors (yellow, magenta and cyan), the ends of the respective colors overlap so that the ununiformity of colors is amplified and they appear in stripe.

SUMMARY OF THE INVENTION

It is an object of the present invention to provide an ink jet recording apparatus which may record a color image with less ununiformity of density.

It is another object of the present invention to provide an ink jet recording apparatus which is of small circuit scale and easy to control the recording.

In order to achieve the above objects, the present invention provides an ink jet recording apparatus for discharging inks of at least three primary colors to repeatedly form swaths of respective colors on a recording medium to complete a record, comprising:

- at least three groups of discharge ports (or ejection orifice) each having a plurality of discharge ports for discharging the inks of at least the three primary colors; and
- scan means for scanning said discharge port groups to the recording medium;
- said discharge port groups being spaced from each other by a distance L in a direction different from the scan direction by said scan means;
- said distance L between said discharge port groups being 8n (n is a positive integer) times of a discharge port pitch P and selected such that joints of swaths of each color are spaced from joints of swaths of other two colors by a substantially equal distance.

Further, the present invention provides a method of ink jet recording by discharging inks of at least three primary colors to repeatedly form swaths of colors on a recording medium to complete a record, comprising the steps of:

- providing at least three discharge port groups each having a plurality of discharge ports for discharging the inks of at least three primary colors;
- said discharge port groups being arranged with a spacing L from each other with the distance L between the discharge port groups being 8n (n is a positive integer) times of a discharge port pitch P;
- scanning said discharge port groups to the recording medium in a direction different from the direction of arrangement of said discharge port groups; and
- supplying image data corresponding to said discharge port groups from an image memory on 8 bits basis.

DETAILED DESCRIPTION OF THE PREFERRED EMBODIMENTS

An embodiment of the present invention is now explained with reference to the drawings.

<First Embodiment>

Figure 1:
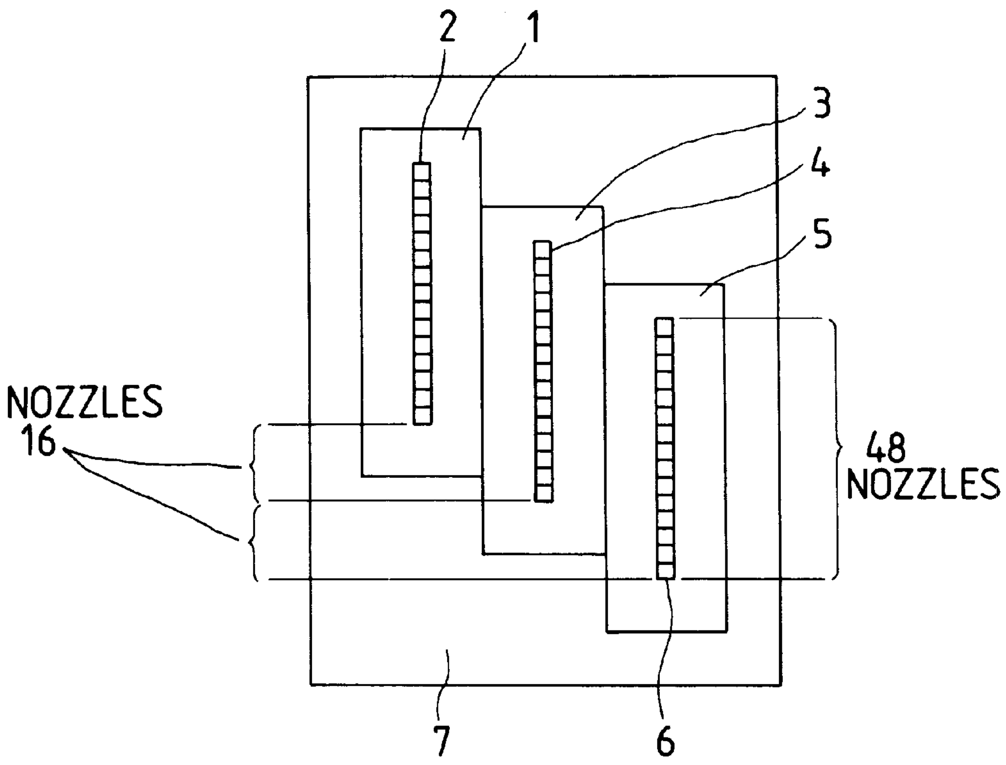
FIG. 1 shows a construction of a head in a first embodiment of the present invention.

A first embodiment of the present invention is shown in FIG. 1. Numeral 1 denotes a head for discharging yellow ink, numeral 2 denotes a group of discharge port (or ejection orifices) of yellow ink, numeral 3 denotes a head for discharging magenta ink, numeral 4 denotes a group of discharge ports of magenta ink, numeral 5 denotes a head for discharging cyan ink, and numeral 6 denotes a group of discharge port of cyan ink. 48 nozzles are arranged in each of the heads. As seen from FIG. 1, the magenta head 3 is spaced from the cyan head 5 by 16 nozzle positions along the nozzles. The yellow head 1 is spaced from the magenta head 3 by 16 nozzle position along the nozzles.

Figure 2:
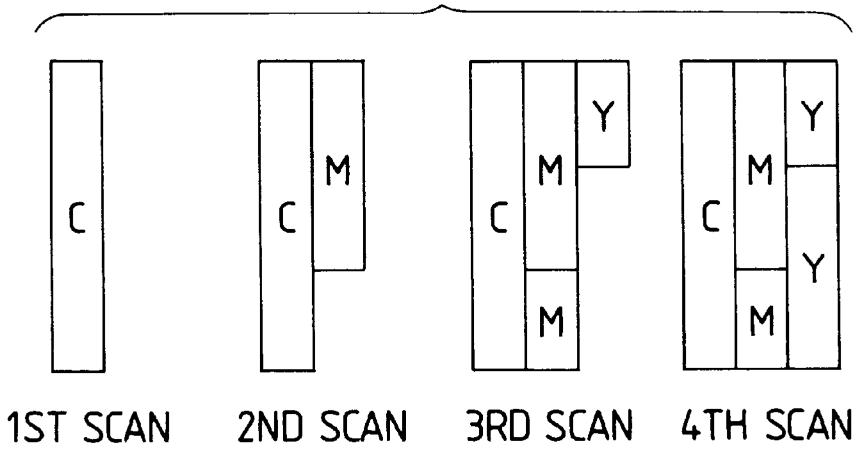
FIG. 2 illustrates recording by the first embodiment.

A printed result by the above construction is shown in FIG. 2. As seen from FIG. 2, as a carriage on which the heads are mounted scans over a record sheet, swaths of the respective colors appear on the record sheet. The joint of the swaths, that is, the portion recorded by the nozzles at the ends of the nozzle groups of the respective colors is spaced from the joints of other two colors by the same distance so that the ununiformity of density is evenly distributed on the record sheet and it is hard to be noticed. For example, when a nozzle density is set to 360 dpi which is required for fine color recording, the nozzle pitch is 70.5 $\mu$m. In the prior art apparatus, significant ununiformity of density appears at a period of 70.5×48=3.384 mm, but in the present embodiment, slight ununiformity appears at a short period of 70.5×16=1.128 mm and an overall quality is not substantially lowered.

An image was formed with shifts of 4 nozzle positions and 8 nozzle positions, but the ununiformity of the colors appeared closely and sharp ununiformity of density appeared at a pitch of approximately 48 nozzles. When the shifts were increased to 14–18 nozzle positions, the ununiformity was substantially not observed. Thus, the overall image quality can be kept by evenly distributing the joints of the colors.

Further, in order to improve the image quality and the clarity of recorded characters, a head for discharging black ink may be added to the above three heads. In this case, the amount of implantation (discharge) of the black ink to the image is smaller than those of other three inks and the ununiformity is hard to be noticed. Accordingly, relationship between the position of the black head and the positions of the heads of other colors may be selected to facilitate recording.

In the present embodiment, since the heads are arranged by shifting 16 nozzle positions along the nozzles, that is, a multiple of 8 nozzle positions, a circuit scale may be small and the control is facilitated as will be explained in a second embodiment.

<Second Embodiment>

Figure 3:
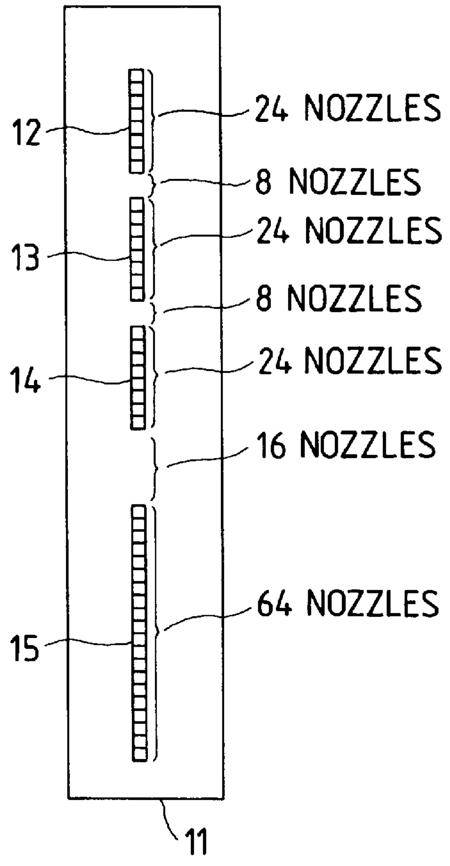
FIG. 3 shows a construction of a head in a second embodiment of the present invention.

A second embodiment of the present invention is shown in FIG. 3. Numeral 11 denotes a single recording head, numeral 12 denotes a group of discharge ports for discharging yellow (Y) ink, numeral 13 denotes a group of discharge ports for discharging magenta (M) ink, numeral 14 denotes a group of discharge ports for discharging cyan (C) ink and numeral 15 denotes a group of discharge ports for discharging black (Bk) ink. The number of nozzles of each of the Y, M and C nozzle groups is 24, and that for the Bk nozzle group is 64. A spacing between the Y and M, and M and C nozzle groups corresponds to 8-nozzle pitch, and that between the C and Bk nozzle groups corresponds to 16-nozzle pitch.

Figure 4A:
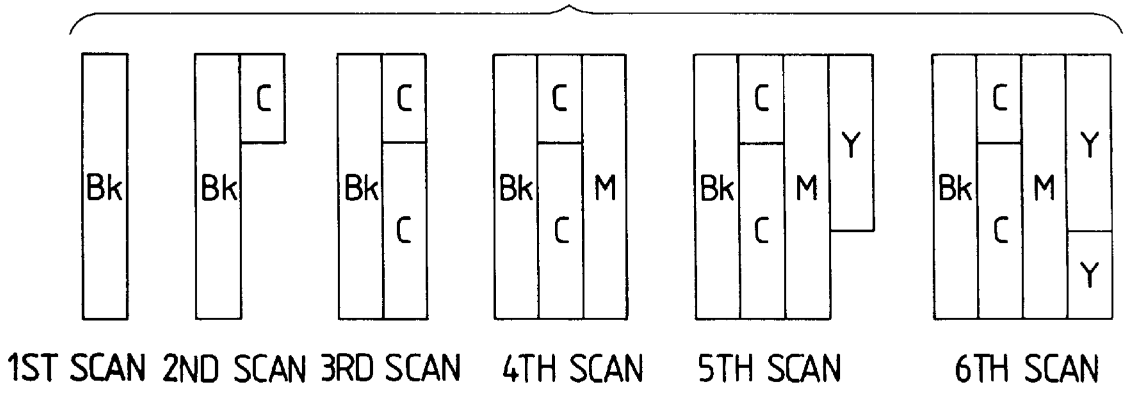
FIGS. 4A and 4B illustrate recording by the second embodiment.
Figure 4B:
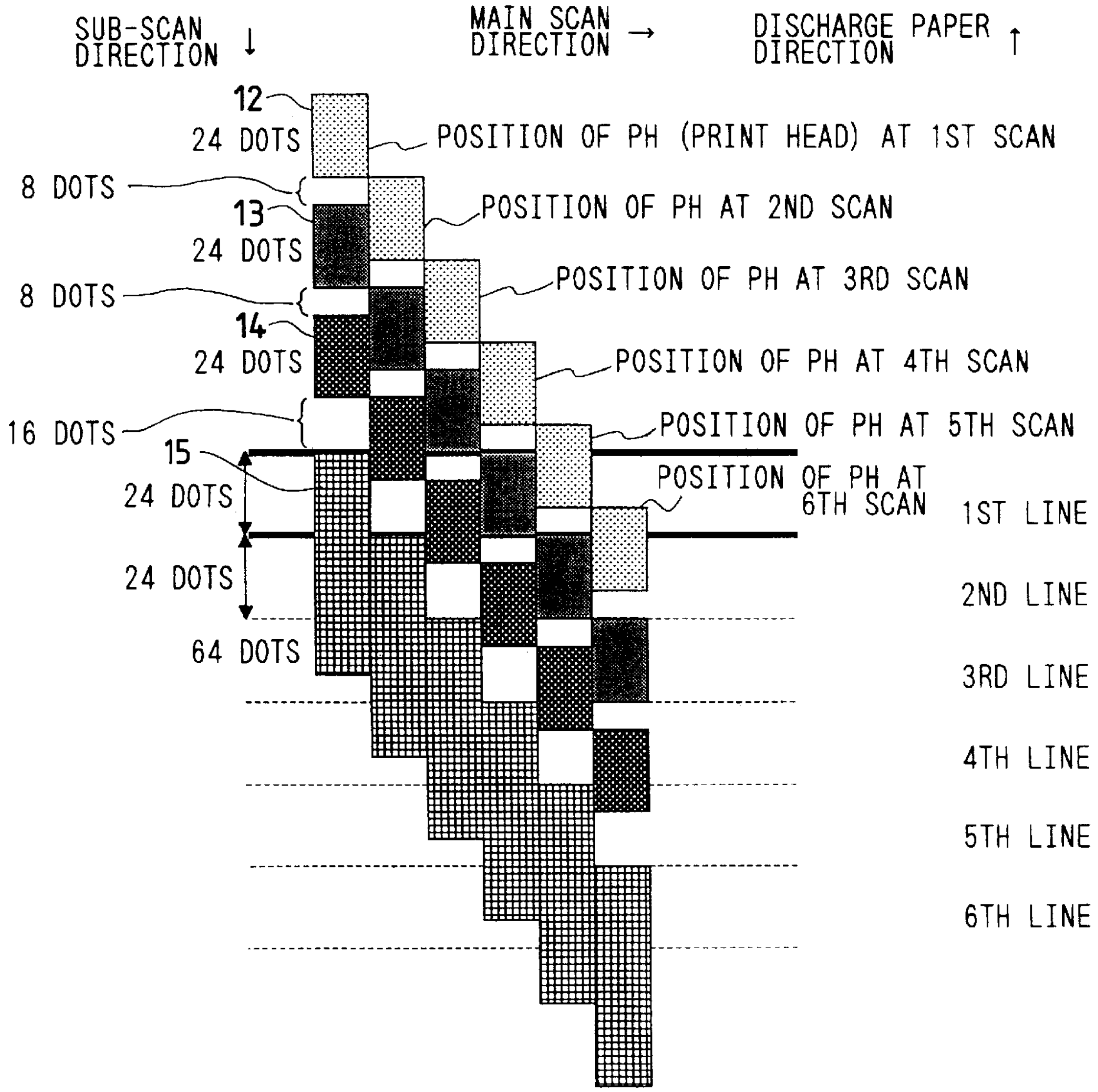

A printed result by the above construction is shown in FIGS. 4A and 4B. In the drawings, a unit of sub-scan is 24 dots and 24 of 64 nozzles are black nozzles. FIG. 4A shows a print process of a first line of FIG. 4B. As seen from FIGS. 4A and 4B, the present embodiment attains the same effect as that of the first embodiment. As shown in Japanese Laid-Open Patent Application No. 1-208143, by spacing the nozzle groups from each other by one dot or more, the contact of inks of different colors on the record sheet in one carriage scan is prevented and the deterioration of the image quality due to the mixture of unfixed inks is prevented.

Further, since the single head is used, the apparatus is of low cost. The 64 black nozzles are provided to permit high speed printing for continuous black-only image by using all black nozzles.

Figure 5:
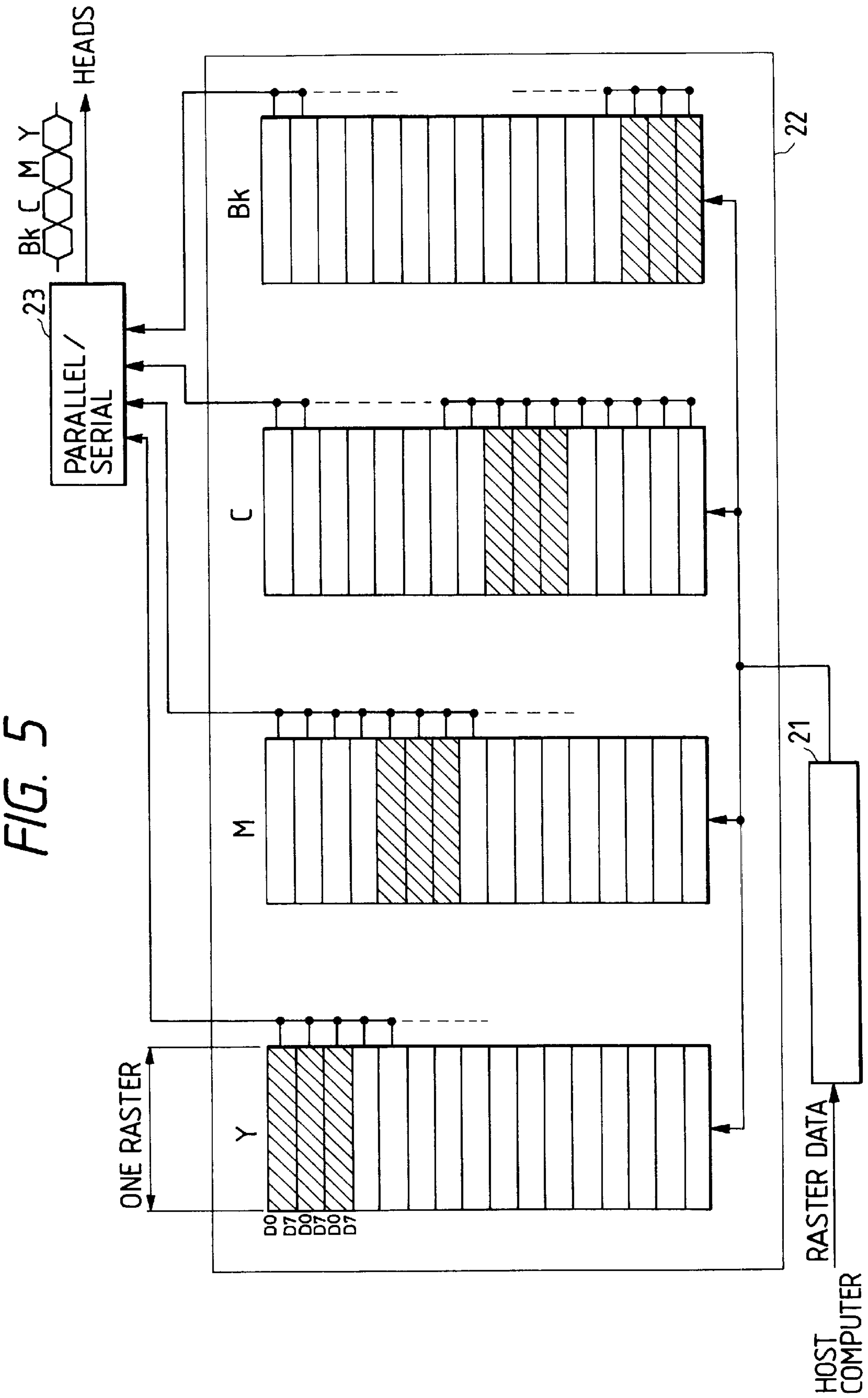
FIG. 5 shows a conceptual view of a circuit of the second embodiment.

A conceptual view of the circuit of the present embodiment is shown in FIG. 5. Image data sent from a host computer is normally raster data, but in order to record it by the head of the present embodiment, the data along the raster (line) must be converted to data along the nozzle line. Thus, when it is transferred from a reception buffer 21 to a drawing buffer 22, the data for 8 nozzles in the raster (line direction) are collectively stored in the buffer at addresses D0–D7 for each unit (byte) of data for 8 nozzles. The print buffer 22 has a predetermined number of such oneraster (line) buffers, and in printing, three bytes (24 nozzles) are sequentially read from three Y buffers, and the bytes are sequentially read from the M, C and Bk buffers. The plurality of line buffers may be formed by a memory.

The Y, M, C and Bk 8-bit (1 byte) data read from the print buffer 22 are converted to serial data (bit by bit) by a parallel to-serial converter 23 and they are supplied to the recording head. Since the data of the respective colors are supplied to the head serially, the number of wires of the head is reduced. The data may be supplied to the head parallelly without the parallel-to-serial conversion.

Since the nozzles for the respective colors are arranged offset to the record sheet, the signals to be simultaneously recorded in one scan is read from different portions of the draw data of the respective colors. Namely, the data in the hatched area in FIG. 5 is recorded. In order to simply implement it, it is desirable that a difference between the data read positions of the respective colors is one byte, that is, the spacing between the nozzle groups of the respective colors corresponds to 8 nozzles.

If it corresponds to 4 nozzles, it is necessary to use a 4-bit organized buffer in a circuit configuration or add a circuit to shift data four bits after it reads the data. In the former case, the number of buffers increases and in the latter case, the number of circuits increases. Thus, both are not desirable. Accordingly, the 24 nozzles and the 8-nozzle spacing in the present embodiment is a most preferable configuration. From the standpoint of circuit configuration, the effect is same so long as the spacing of the nozzle groups is selected by bytes. In other words, the spacing of the nozzle groups may be a multiple of 8-nozzle pitch.

Figure 6:
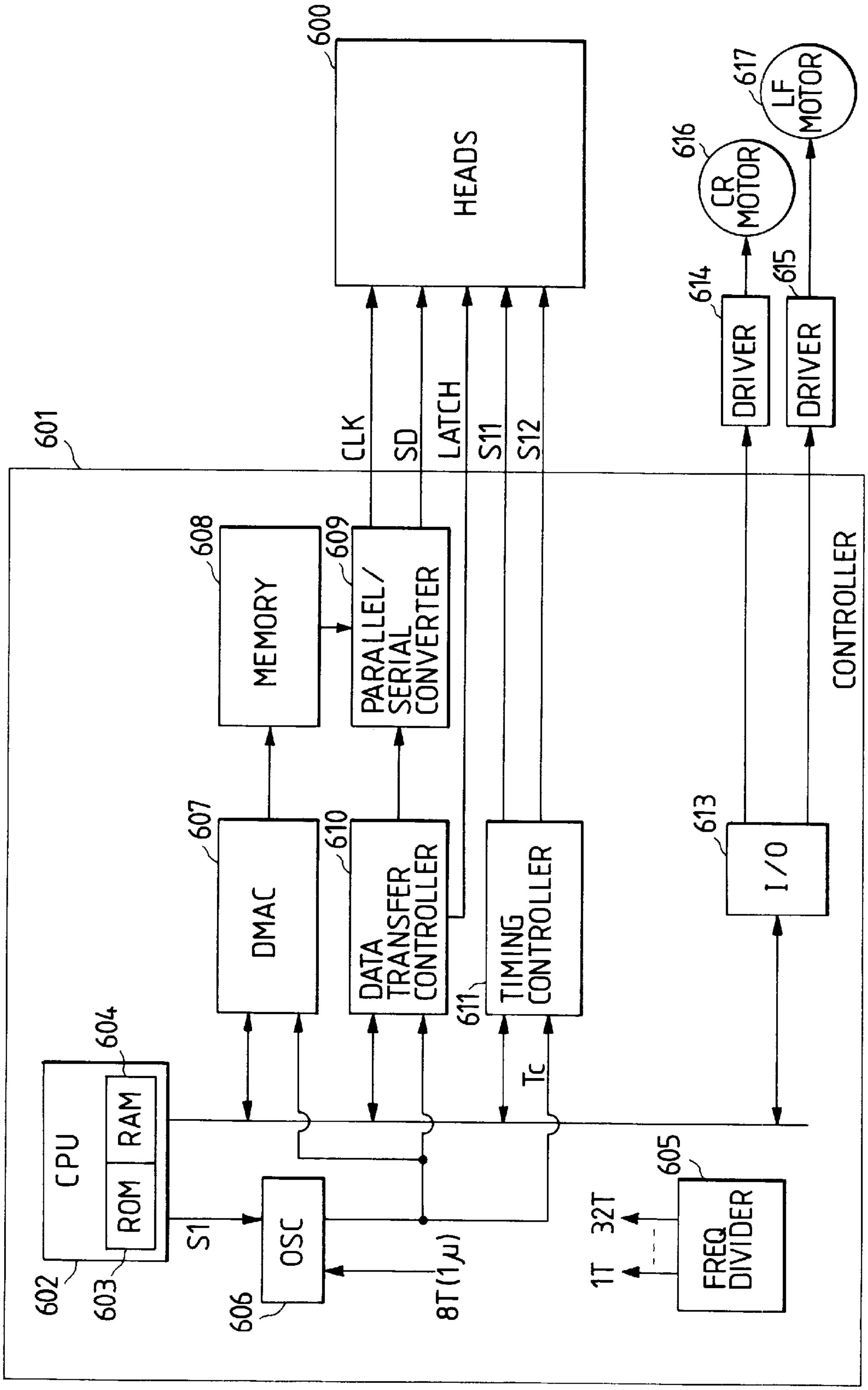
FIG. 6 shows a circuit diagram of the second embodiment.

FIG. 6 shows a block diagram of a configuration of a printer in the present embodiment.

In FIG. 6, numeral 601 denotes a control unit which controls the overall printer. Numeral 602 denotes a CPU such as a microprocessor, numeral 603 denotes a ROM which stores a control program to be executed by the CPU 602 and various data, and numeral 604 denotes a RAM which is used as a work area when the CPU 602 executes various processes and temporarily stores various data. Numeral 605 denotes a frequency divider which has a clock source of 16 MHz and supplies various clock signals 1T–32T having periods of 125 ns to 4 μs. When the CPU 602 outputs a print section signal $S_1$, a timing signal having an ink discharge period during the high level period of the signal $S_1$ is outputted from an oscillator 606. In the present embodiment, since the discharge period of the head 600 is 185 μs (5.405 KHz), the oscillator 606 receives the clock 8T (1 μs period) from the frequency divider 605 and outputs the clock signal of 5.405 KHz in the high level period.

Numeral 607 denotes a DMCA (DMA controller). When start of DMA transfer is commanded from the CPU 602, it reads data from a memory (DRAM) 608 at every 185 μs and supplies it to a parallel-to-serial converter 609, which converts the parallel data transferred from the memory 608 to the DMA to serial data and transfers it to a shift register of the head 2. Numeral 610 denotes a data transfer control unit which outputs a latch signal (LATCH) to a latch circuit of the head 2. A timing control circuit 611 provides a drive pulse for the head 2 and a block signal (3 bits) to be driven.

Numeral 613 denotes an input/output port (I/O), and corresponding motors (a CR motor 616 and an LF motor 617) are driven by drivers 614 and 615 through the port 613. While not shown in FIG. 6, a temperature control heater may be provided with the head 600 and an appropriate power may be supplied thereto to keep the temperature of the head 600 constant.

Figure 7:
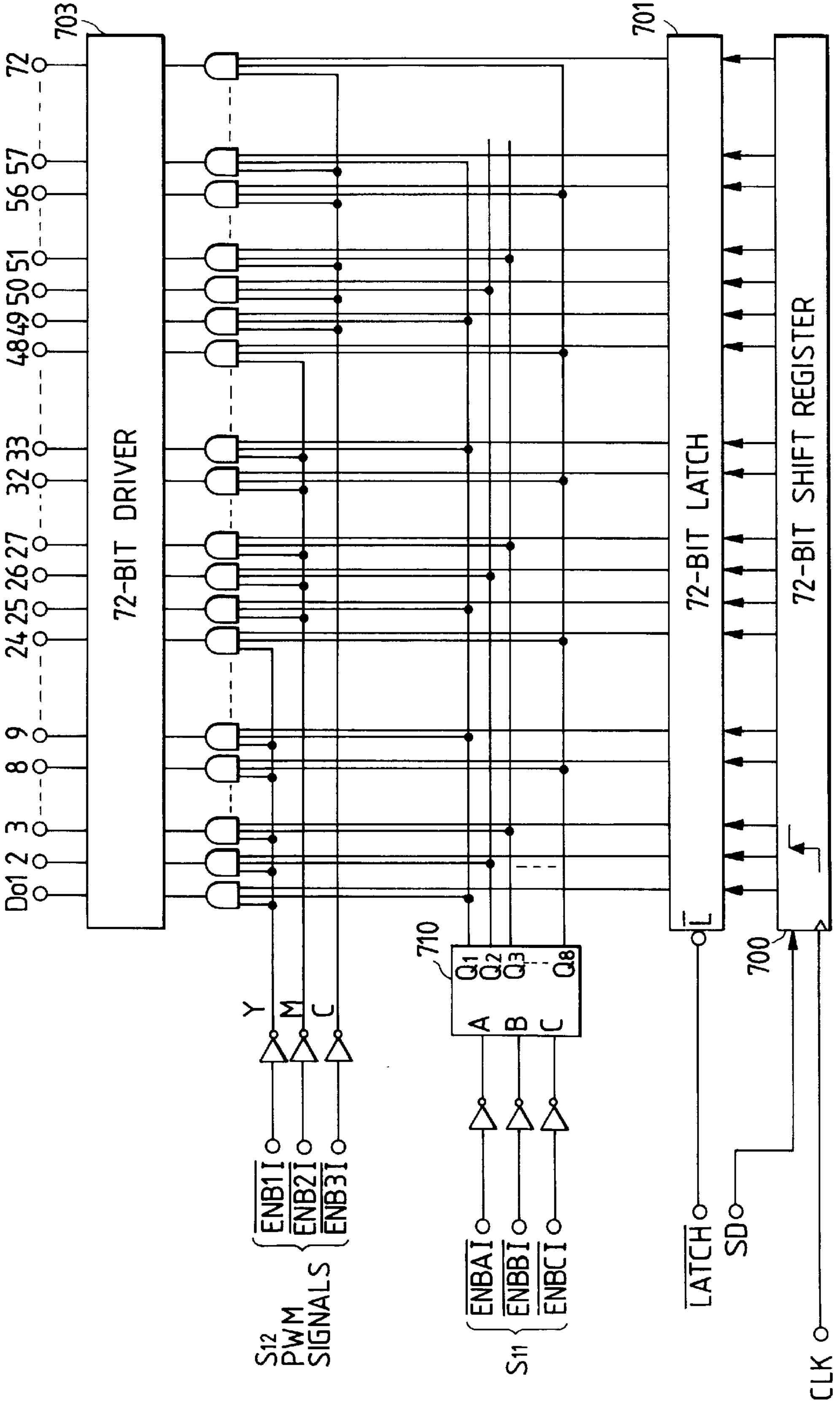
FIG. 7 shows a drive circuit of the head of the second embodiment.

FIG. 7 shows a block diagram of the head 600.

Numeral 700 shows a 72-bit shift register which stores serial data (SD) transferred in synchronism with a serial clock (CLK). Numeral 701 denotes a latch circuit which latches the 72-bit data outputted from the shift register 700 by a latch signal (LATCH). Numeral 703 denotes a driver for driving the nozzles for 72 bits. Numeral 710 denotes a decoder which receives a 3-bit signal S11 from a timing control unit 111 and selectively outputs $Q_1$ to $Q_8$ in accordance with the three bits to determine the block to be driven.

The head 600 is constructed by three-color nozzles, that is, 72 nozzles (24×3) are constructed by 8 blocks with each block having 9 nozzles (for example, 1, 9, . . . 65). When the signal $S_{11}$ is applied to the decoder 10, the block to be activated is determined in accordance with the content thereof. On the other hand, a drive pulse corresponding to the color is applied as a signal $S_{12}$ and the amount of discharge of the ink of the corresponding color is determined in accordance with a pulse width of the signal $S_{12}$. For the Bk ink, the circuit configuration of the head is identical to that of the head shown in FIG. 7 except that the shift register is modified from 72 bits to 64 bits. The Bk circuit is serially connected in front of the Y, M and C circuits.

Figure 8:
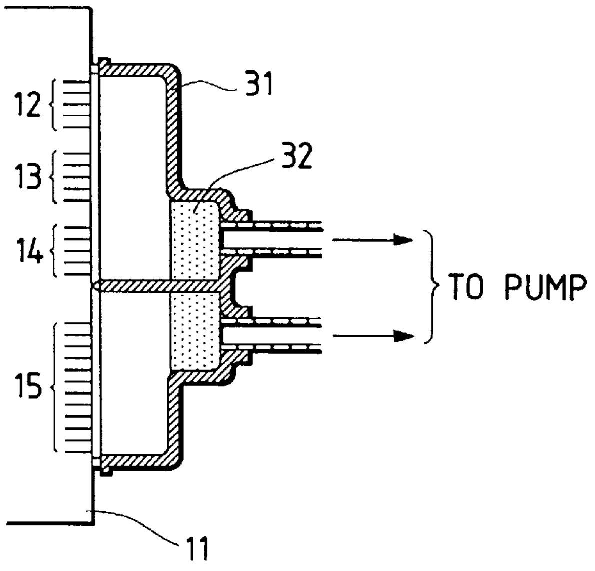
FIG. 8 shows the second embodiment having a cap applied thereto.

In the present embodiment, the spacing between C and Bk is 16 nozzle positions. Since the implantation of Bk to the image is smaller than those of other colors as described above, the positional relation to other Y, M, and C nozzle groups is not sensitive on the image. A feature of the present construction permits the provision of two nozzle caps. Namely, when the nozzle pitch is 70.5 $\mu$m (360 dpi), the 8-nozzle spacing corresponds to 70.5×8=0.564 mm and it is not easy to provide a partition therebetween while maintaining airtight. However, 16-nozzle spacing corresponds to 70.5×16=1.128 mm and it is possible to provide a partition between Bk and the color as shown in FIG. 8. In FIG. 8, numeral 31 denotes a cap and numeral 32 denotes a sponge. Other numerals denote like elements to those of FIG. 3.

Where the spacings between Y and M, and M and C are 16 nozzle positions, a nozzle cap may be used for each color. Since the ununiformity is evenly distributed in this case, the image quality is not lowered.

Figure 9:
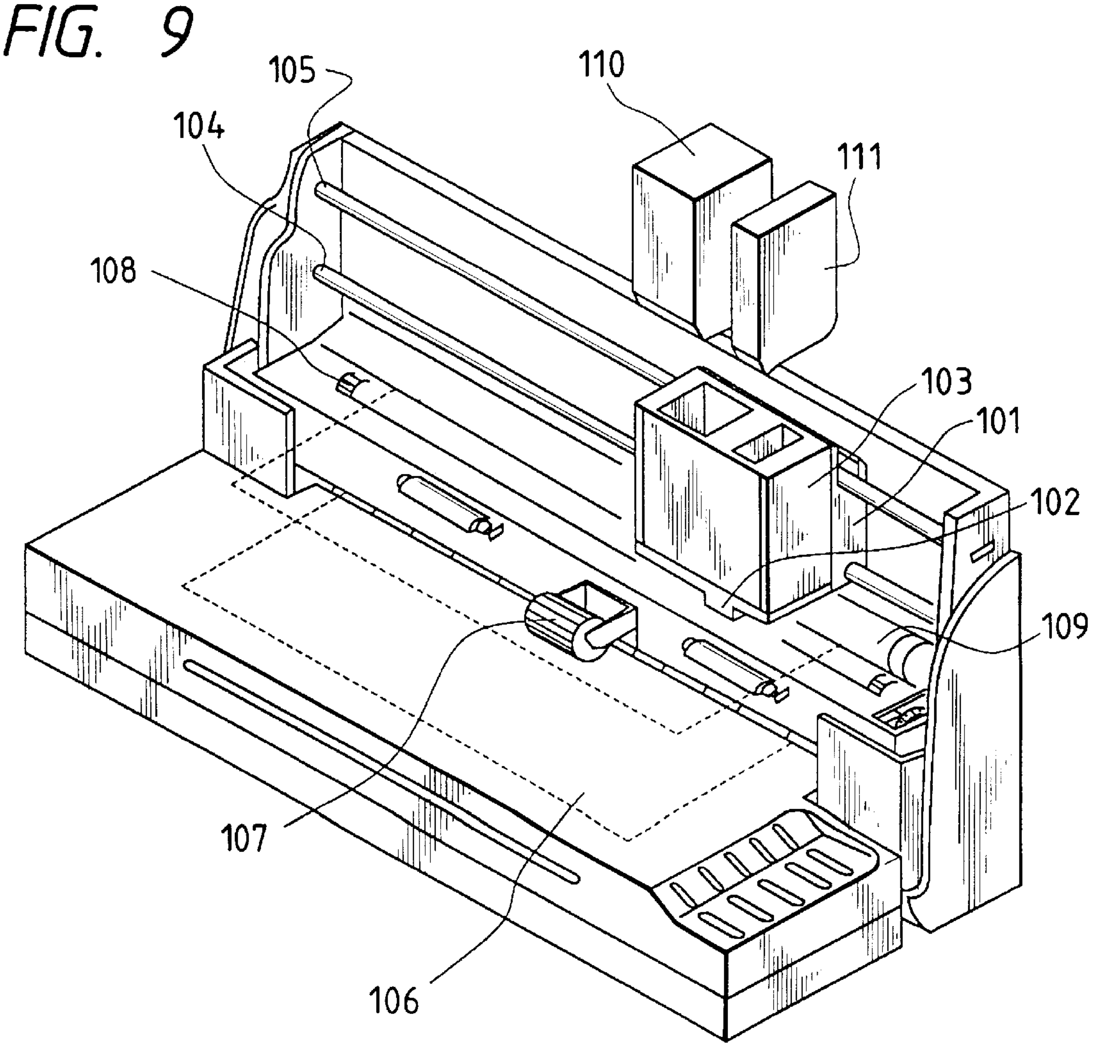
FIG. 9 shows a perspective view of a recording apparatus to which the present invention may be applied.

FIG. 9 shows a perspective view of an ink jet printer to which the present invention may be applied.

A carriage 101 carries a print head 102 and a cartridge 103 and is scanned over a guide shaft 104 and a guide shaft 105. A record sheet 106 is fed into the apparatus by a feed roller 107 and fed to a front of a feed roller 108 while it is pinched by the feed roller 108, a pinch roller (not shown) and a sheet retainer 109. A color ink cartridge 110 which accommodates three colors, yellow, magenta and cyan and a black ink cartridge 111 are separately loaded in a cartridge 103 which is linked to the print head 102.

Figure 10:
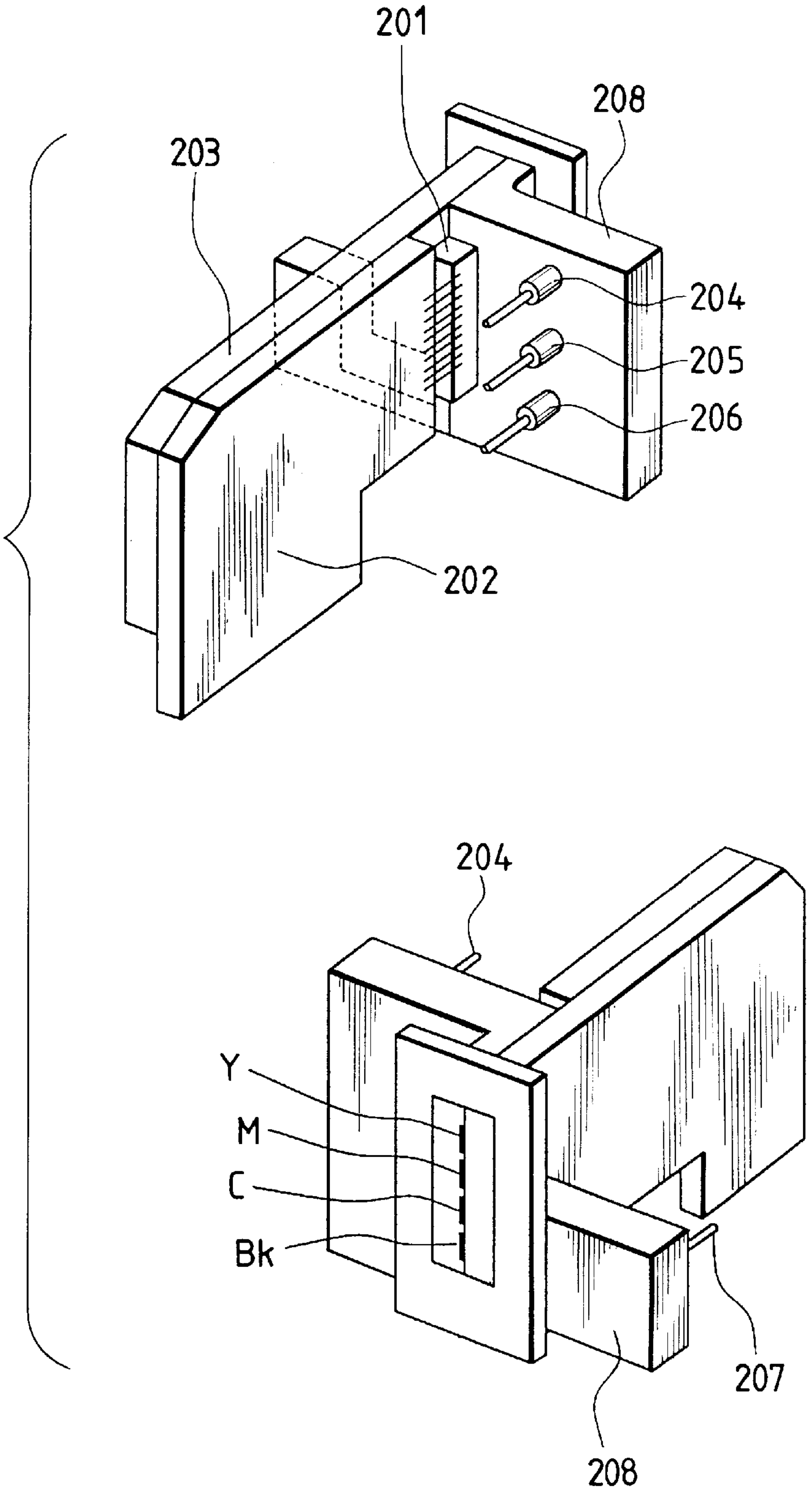
FIG. 10 shows a construction of a head to which the present invention may be applied.

The print head 102 is explained in more detail with reference to FIG. 10. The yellow, magenta, cyan and black discharging port groups are arranged in a line on the front of the print head 102. Each group has 24 discharge ports for each of yellow, magenta and cyan, and 64 discharge ports for black. The spacing between the color groups is 8 nozzle positions, and the spacing between the color group and the black group is 16 nozzle positions. Those nozzles are arranged at a density of 360 per inch (360 dpi).

An ink path connected to the discharge port is provided for each of the discharge ports, and a common liquid chamber for supplying ink to the liquid path is provided on the rear of the ink paths. An electro-thermal transducer for generating thermal energy to be used to discharge the ink droplet from the discharge port and an electrode wiring for supplying a power thereto are provided to the ink path corresponding to each discharge port. The electro-thermal transducers and the electrode wirings are formed on a silicon substrate 201 by film forming technique. Resin, an isolation layer made of glass and a top layer are laminated on the substrate to form the discharge ports, ink paths and common liquid chamber. A drive circuit for driving the electro-thermal transducers in accordance with an electrical signal is provided in a form of a printed circuit board on the rear thereof.

The silicon substrate 202 and the printed circuit board are parallel to an aluminum plate 203, and pipes 204–207 project from a plastic member 208 called a distributor which is extended normally to the silicon substrate and they communicate with the flow paths which communicate with the common liquid chamber.

The four flow paths for yellow, magenta, cyan and black are provided in the distributor and they communicate with the respective common liquid chambers through pipes.

Ink of approximately 40 ng is discharged from each of the yellow, magenta and cyan discharge ports provided in the print head 102 and ink of approximately 80 ng is discharged from the black discharge port at a frequency of 5.4 KHz.

The print head 102 is provided with 24 discharge ports for each of yellow, magenta and cyan, and 64 discharge ports for black. This permits high speed printing by using all black nozzles when a black-only image continues. Where a color image is mixedly present, 24 nozzles which are same in number to that of the color discharge ports are used for printing.

The present invention is particularly suitably usable in an ink jet recording head and a recording apparatus in which thermal energy by an electro-thermal transducer, a laser beam or the like is used to cause a change of state of the ink to eject or discharge the ink, because the high density of pixels and high resolution of recording are attained.

The typical construction and the operational principles are preferably the ones disclosed in U.S. Pat. No. 4,723,129 and U.S. Pat. No. 4,740,796. The principle and the structure are applicable to a so-called on-demand type recording system and a continuous type recording system. Particularly, however, it is suitable for the on-demand type because the principle is such that at least one driving signal is applied to an electro-thermal transducer disposed on a liquid (ink) retaining sheet or liquid passage, the driving signal being large enough to provide such a quick temperature rise beyond a departure from nucleation boiling point, by which the thermal energy is provided by the electro-thermal transducer to produce film boiling on the heating portion of the recording head, whereby a bubble can be formed in the liquid (ink) corresponding to each of the driving signals. By the generation, development and contraction of the bubbles, the liquid (ink) is ejected through a discharge port to produce at least one droplet. The driving signal is preferably in the form of pulse because the development and the contraction of the bubbles can be effected instantaneously, and therefore the liquid (ink) is ejected with fast response. The driving signal is preferably such as those disclosed in U.S. Pat. No. 4,463,359 and U.S. Pat. No. 4,345,262. In addition, the temperature rise rate of the heating surface is preferably such as those disclosed in U.S. Pat. No. 4,313,124.

The structure of the recording head may be those shown in U.S. Pat. No. 4,558,333 and U.S. Pat. No. 4,459,600 in which the heating portion is disposed at a bent portion, as well as the structure of the combination of the ejection outlet, liquid passage and the electro-thermal transducer disclosed in the above-mentioned patents. In addition, the present invention is applicable to the structure disclosed in Japanese Laid-Open Patent Application No. 59-123670 in which a common slit is used as the discharge port for a plurality of electro-thermal transducers, and the structure disclosed in Japanese Laid-Open Patent Application No. 59-138461 in which an opening for absorbing a pressure wave of thermal energy is formed corresponding to the discharge port. This is because the present invention is effective to preform the recording with certainty and high efficiency irrespective of the type of the recording head.

Further, the present invention is applicable to a serial type recording head in which the recording head is fixed on a main assembly, to a replaceable chip type recording head which is connected electrically with the apparatus and can be supplied with the ink when it is mounted in the main assembly, or to a cartridge type recording head having an integral ink container.

The provision of the recovery means and/or the auxiliary means for the preliminary operation are preferable because they further stabilize the effects of the present invention. As for such means, there are capping means for the recording head, cleaning means therefor, pressing or sucking means, preliminary heating means which may be an electro-thermal transducer, an additional heating element or a combination thereof. Also, means for effecting preliminary discharge (not for the recording) may stabilize the recording operation.

As regards the variation of the recording head mountable, it may be a single for a single color or plural for a plurality of inks having different colors or densities. The present invention is effectively applicable to an apparatus having at least one of a monochromatic mode mainly with black, a multi-color mode with different color inks and/or full color mode using the mixture of colors, which may be an integrally formed recording unit or a combination of a plurality of recording heads.

Furthermore, in the foregoing embodiment, the ink is liquid. Alternatively, ink which is solidified below a room temperature and liquefied at a room temperature may be used. Since the ink is controlled within a temperature range of not lower than 30° C. and not higher than 70° C. to stabilize the viscosity of the ink to provide the stable discharge in a conventional recording apparatus of this type, the ink may be such that it is liquid within the temperature range when the recording signal is supplied. The present invention is applicable to other type of ink. In one of them, the temperature rise due to the thermal energy is positively prevented by consuming it for the state change of the ink from the solid state to the liquid state. Other ink which is solidified when it is left is used to prevent the evaporation of the ink. In any case, by the application of the recording signal producing thermal energy, the ink is liquefied and the liquefied ink may be discharged. Other ink may start to be solidified at the time when it reaches the recording sheet. The present invention is also applicable to the ink which is liquefied by the application of the thermal energy. Such ink may be retained in liquid state or solid state in holes or recesses formed in a porous sheet as disclosed in Japanese Laid-Open Paten Application No. 54-56,847 and Japanese Laid-Open Patent Application No. 60-71,260. The sheet is face to the electro-thermal transducers. The most effective one of the inks described above is the film boiling system.

The ink jet recording apparatus may be used as an output terminal of an information processing apparatus such as a computer or the like, as a copying machine combined with an image reader or the like, or as a facsimile machine having information sending and receiving functions.

While the invention has been described with reference to the structures disclosed herein, it is not confined to the details set forth and the present invention is intended to cover such modifications or changes as may come within the objects of the improvements or the scope of the claims.

In accordance with the present invention, the joints of colors are arranged at a constant interval so that a high grade color image is attained with a minimum cost.

Since the discharge port groups of the respective colors are shifted form each other by 8n times of the discharge port pitch, the control to reading data is facilitated.

What is claimed is:

1. An ink jet recording apparatus for discharging a plurality of inks of at least three primary colors to repeatedly form a plurality of swaths of respective said colors on a recording medium to complete a record, each pair of said swaths having a joint therebetween, comprising:

at least three groups of discharge ports, each said group having a plurality of discharge ports for discharging the inks of the at least three primary colors, said discharge ports in each said group being spaced apart from one another by a discharge port pitch P; and scan means for scanning said discharge port groups in a scan direction relative to the recording medium;

said discharge port groups being staggered or spaced apart from each other by a distance L in a direction different from the scan direction by said scan means;

said distance L between said discharge port groups being 8n times the discharge port pitch P, n being a positive integer, and being selected such that the joints of the swaths of each said color are spaced from the joints of the swaths of two other said colors;

a number of image buffers for storing an image data in a plurality of units of eight bits, each of said units of 8 bits constituting one byte and corresponding to an arrangement direction of said discharge ports, each said unit having a bit stored at a beginning data read address and a bit stored at an ending data read address, the number of buffers corresponding to a number of the groups of said discharge ports; and transferring means for transferring the image data to said image buffers, wherein the image data has a first information in a given said image buffer that includes at least one said unit and a second information in a succeeding and different said image buffer that includes at least one said unit, said first and said second information being recorded in a same scan and corresponding to respective different said inks, and the ending data read address of a last said unit in the first information and the beginning data read address of a first said unit in the second information are separated by an amount that is an integer multiple of one byte; and image data supply means for supplying the image data to each of the groups of discharge ports, wherein the image data supply means supplies the image data from said image buffers to said discharge ports in a unit of one byte at a time.

2. An ink jet recording apparatus according to claim 1 wherein said discharge port groups and said discharge ports are arranged on one line.

3. An ink jet recording apparatus according to claim 1 wherein said discharge port groups are formed in one recording head.

4. An ink jet recording apparatus according to claim 1 wherein a number of said discharge ports of said black discharge port group is larger than a number of said discharge ports of each of said discharge port groups of the other colors.

5. An ink jet recording apparatus according to claim 4 wherein said discharge port groups are formed in one recording head.

6. An ink jet recording apparatus according to claim 5 wherein said discharge port groups and said discharge ports are arranged on one line.

7. An ink jet recording apparatus according to claim 1 further comprising:

an image memory for storing said image data corresponding to said discharge port groups, said image memory supplying said image data to corresponding said discharge port groups on an 8 bits basis.

8. An ink jet recording apparatus according to any one of claims 1, 2, 4 or 5–7, further comprising ejection means for causing said discharge ports to discharge the inks by applying thermal energy thereto.

9. A method of ink jet recording by discharging a plurality of inks of at least three primary colors to repeatedly form a plurality of swaths of respective said colors on a recording medium to complete a record, each pair of said swaths having a joint therebetween, comprising the steps of:

providing at least three discharge port groups, each said group having a plurality of discharge ports for discharging the inks of the at least three primary colors, said discharge ports being spaced apart from one another by a discharge port pitch P;

staggering or spacing apart said discharge port groups in a direction of arrangement with a spacing L apart from each other with the distance L between the discharge port groups being 8n times the discharge port pitch P, n being a positive integer;

scanning said discharge port groups in a scan direction relative to the recording medium in a direction different from the direction of arrangement of said discharge port groups;

providing a number of image buffers for storing image data in a plurality of units of eight bits, each of said units of 8 bits constituting one byte and corresponding to an arrangement direction of the discharge ports, each said unit having a bit stored at a beginning data read address and a bit stored at an ending data read address, the number of buffers corresponding to a number of the groups of said discharge ports; and transferring the image data to said image buffers, wherein the image data has a first information in a given said image buffer that includes at least one said unit and a second information in a succeeding and different said image buffer that includes at least one said unit, said first and said second information being recorded in a same scan and corresponding to respective different said inks, and the ending data read address of a last said unit in the first information and the beginning data read address of a first said unit in the second information are separated by an amount that is an integer multiple of one byte; and supplying image data corresponding to said discharge port groups from said image buffers on an 8 bits basis, wherein the image data stored in said storing step is supplied to each of the groups of discharge ports in a unit of one byte at a time, whereby the joints of the swaths of each said color are spaced from the joints of the swaths of two other said colors by a substantially equal distance.

10. A method of ink jet recording apparatus according to claim 9 wherein said discharge port groups and said discharge ports are arranged on one line.

11. A method of ink jet recording apparatus according to claim 9 wherein said discharge port groups are arranged on one line.

12. An ink jet recording method according to any one of claims 10 or 11, further comprising a step of causing said discharge ports to discharge the inks by applying thermal energy thereto.

13. An ink jet recording apparatus for discharging a plurality of inks of at least three primary colors to repeatedly form a plurality of swaths of respective said colors on a recording medium to complete a record, each pair of said swaths having a joint therebetween, comprising:

at least three groups of discharge ports, each said group having a plurality of discharge ports for discharging the inks of the at least three primary colors, said discharge ports in each said group being spaced apart from one another by a discharge port pitch P; and scan means for scanning said discharge port groups in a scan direction relative to the recording medium;

said discharge port groups being staggered or spaced apart from each other by a distance L in a direction different from the scan direction by said scan means;

said distance L between said discharge port groups being 8n times the discharge port pitch P, n being a positive integer;

a number of image buffers for storing an image data in a Plurality of units of eight bits, each of said units of eight bits constituting one byte and corresponding to an arrangement direction of said discharge ports, each said unit having a bit stored at a beginning data read address and a bit stored at an ending data read address. the number of buffers corresponding to a number of the groups of said discharge ports; and transferring the image means for transferring data to said image buffers.

wherein the image data has a first information in a given said image buffer that includes at least one said unit and a second information in a succeeding and different said image buffer that includes at least one said unit, said first and said second information being recorded in a same scan and corresponding to respective different said inks, and the ending data read address of a last said unit in the first information and the beginning data read address of a first said unit in the second information are separated by an amount that is an integer multiple of one byte; and image data supply means for supplying the image data to each of the groups of discharge ports, wherein the image data supply means supplies the image data from said image buffers to said discharge ports in a unit of one byte at a time.

14. A method of ink jet recording by discharging a plurality of inks of at least three primary colors to repeatedly form a plurality of swaths of respective said colors on a recording medium to complete a record, each pair of said swaths having a joint therebetween, comprising the steps of:

providing at least three discharge port groups, each said group having a plurality of discharge ports for discharging the inks of the at least three primary colors, said discharge ports in each said group being spaced apart from one another by a discharge port pitch P;

staggering or spacing apart said discharge port groups in a direction of arrangement with a spacing L apart from each other with the distance L between the discharge port groups being 8n times the discharge port pitch P, n being a positive integer;

scanning said discharge port groups in a scan direction relative to the recording medium in a direction different from the direction of arrangement of said discharge port groups;

providing a number of image buffers for storing image data in a Plurality of units of eight bits, each of said units of eight bits constituting one byte and corresponding to an arrangement direction of the discharge ports, each said unit having a bit stored at a beginning data read address and a bit stored at an ending data read address, the number of buffers corresponding to a number of the groups of said discharge ports; and transferring the image data to said image buffers.

wherein the image data has a first information in a given said image buffer that includes at least one said unit and a second information in a succeeding and different said image buffer that includes at least one said unit, said first and said second information being recorded in a same scan and corresponding to respective different said inks, and the ending data read address of a last said unit in the first information and the beginning data read address of a first said unit in the second information are separated by an amount that is an integer multiple of one byte; and supplying image data corresponding to said discharge port groups from said image buffers on an 8 bits basis, wherein the image data stored in said storing step is supplied to each of the groups of discharge ports in a unit of one byte at a time.

15. An ink jet recording head for use in a recording apparatus for discharging a plurality of inks of at least three primary colors to repeatedly form a plurality of swaths of respective said colors on a recording medium to complete a record, each pair of said swaths having a joint therebetween, said recording apparatus having scan means for scanning said discharge port groups in a scan direction relative to the recording medium, said recording head comprising:

at least three groups of discharge ports, each said group having a plurality of discharge ports for discharging the inks of the at least three primary colors, said discharge ports being spaced apart from one another by a discharge port pitch P;

said discharge port groups being staggered or spaced apart from each other by a distance L in a direction different from the scan direction by said scan means;

said distance L between said discharge port groups being 8n times the discharge port pitch P, n being a positive integer, and being selected such that the joints of the swaths of each said color are spaced from the joints of the swaths of two other said colors, wherein the recording apparatus in which the ink jet recording head is used has a number of image buffers for storing an image data in a plurality of units of eight bits, each of said units of eight bits constituting one byte and corresponding to an arrangement direction of said discharge ports, each said unit having a bit stored at a beginning data read address and a bit stored at an ending data read address, the number of buffers corresponding to a number of the groups of said discharge ports; and transferring the image means for transferring data to said image buffers, wherein the image data has a first information in a given said image buffer that includes at least one said unit and a second information in a succeeding and different said image buffer that includes at least one said unit, said first and said second information being recorded in a same scan and corresponding to respective different said inks, and the ending data read address of a last said unit in the first information and the beginning data read address of a first said unit in the second information are separated by an amount that is an integer multiple of one byte, and the recording apparatus also includes image data supply means for supplying the image data to each of the groups of discharge ports, wherein the image data supply means supplies the image data from said image buffers to said discharge ports in a unit of one byte at a time.

16. An ink jet recording head according to claim 15, wherein said discharge port groups and said discharge ports are arranged on one line.

17. An ink jet recording head according to claim 15, wherein said discharge port groups are formed in one recording head.

18. An ink jet recording head according to claim 15, wherein a number of said discharge ports of said black discharge port group is larger than a number of said discharge ports of each of said discharge port groups of the other colors.

19. An ink jet recording head according to claim 18, wherein said discharge port groups are formed in one recording head.

20. An ink jet recording head according to claim 19, wherein said discharge port groups and said discharge ports are arranged on one line.

21. An ink jet recording head according to claim 15, wherein said recording apparatus further comprises:

an image memory for storing said image data corresponding to said discharge port groups, said image memory supplying said image data to corresponding said discharge port groups on an 8 bits basis.

22. An ink jet recording head according to any one of claims 15–21, further comprising ejection means for causing said discharge ports to discharge the inks by applying thermal energy thereto.

* * * * *

UNITED STATES PATENT AND TRADEMARK OFFICE
CERTIFICATE OF CORRECTION

PATENT NO. : 5,956,056

DATED : September 21, 1999

INVENTOR(S) : MINEO KANEKO ET AL

It is certified that error appears in the above-identified patent and that said Letters Patent is hereby corrected as shown below:

ON THE TITLE PAGE:

At CPA, add
--[*] Notice: This patent issued on a continued prosecution application filed under 37 CFR 1.53(d), and is subject to the twenty year patent term provisions of 35 U.S.C. 154(a)(2).--

ON THE TITLE PAGE [57] ABSTRACT:

Line 13, "multiply" should read --multiple--.

COLUMN 2:

Line 55, "position" should read --positions--.

COLUMN 3:

Line 66, "oneraster" should read --one-raster--.

COLUMN 4:

Line 5, "parallel" should read --parallel- --.

UNITED STATES PATENT AND TRADEMARK OFFICE

CERTIFICATE OF CORRECTION

PATENT NO. : 5,956,056

DATED : September 21, 1999

INVENTOR(S) : MINEO KANEKO ET AL

It is certified that error appears in the above-identified patent and that said Letters Patent is hereby corrected as shown below:

COLUMN 7:

Line 8, "preform" should read --perform--; and
Line 56, "Paten" should read --Patent--.

COLUMN 8:

Line 7, "form" should read --from--.

COLUMN 9:

Line 13, "claims 1, 2, 4 or 5-7" should read --claims 1-7--.

COLUMN 10:

Line 26, "Plurality" should read --plurality--; and
Line 33, "transferring the image means for transferring" should read --tranferring means for transferring the image--.

COLUMN 11:

Line 6, "Plurality" should read --plurality--.

UNITED STATES PATENT AND TRADEMARK OFFICE

CERTIFICATE OF CORRECTION

PATENT NO. : 5,956,056

DATED : September 21, 1999

INVENTOR(S) : MINEO KANEKO ET AL

It is certified that error appears in the above-identified patent and that said Letters Patent is hereby corrected as shown below:

COLUMN 12:

Line 7, "transferring the image means for transferring" should read --transferring means for transferring the image--.

Signed and Sealed this

Twenty-ninth Day of August, 2000

Attest:

Q. TODD DICKINSON

*Attesting Officer*

*Director of Patents and Trademarks*

UNITED STATES PATENT AND TRADEMARK OFFICE

CERTIFICATE OF CORRECTION

PATENT NO. : 5,956,056

DATED : September 21, 1999

INVENTOR(S) : MINEO KANEKO ET AL

It is certified that error appears in the above-identified patent and that said Letters Patent is hereby corrected as shown below:

ON THE TITLE PAGE:

add

--[*] Notice: This patent issued on a continued prosecution application filed under 37 CFR 1.53(d), and is subject to the twenty year patent term provisions of 35 U.S.C. 154(a)(2).--

Signed and Sealed this

Thirtieth Day of January, 2001

Attest:

Q. TODD DICKINSON

Attesting Officer

Director of Patents and Trademarks